United States Patent
Adachi et al.

(10) Patent No.: US 10,024,575 B2
(45) Date of Patent: Jul. 17, 2018

(54) HEATING-MEDIUM HEATING UNIT AND VEHICLE AIR CONDITIONER USING THE SAME

(75) Inventors: Tomoyasu Adachi, Tokyo (JP); Nobuya Nakagawa, Tokyo (JP); Shiro Matsubara, Tokyo (JP); Naoto Kunieda, Aichi (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 648 days.

(21) Appl. No.: 13/499,994

(22) PCT Filed: Apr. 1, 2011

(86) PCT No.: PCT/JP2011/058417
§ 371 (c)(1),
(2), (4) Date: Apr. 3, 2012

(87) PCT Pub. No.: WO2011/129201
PCT Pub. Date: Oct. 20, 2011

(65) Prior Publication Data
US 2012/0193339 A1    Aug. 2, 2012

(30) Foreign Application Priority Data
Apr. 14, 2010 (JP) ................... 2010-093294

(51) Int. Cl.
*F24H 9/02* (2006.01)
*F24H 9/18* (2006.01)
(Continued)

(52) U.S. Cl.
CPC ......... *F24H 9/1827* (2013.01); *B60H 1/2221* (2013.01); *F24H 1/009* (2013.01);
(Continued)

(58) Field of Classification Search
CPC ............................. H05B 2203/02; H05B 3/50
(Continued)

(56) References Cited

U.S. PATENT DOCUMENTS

4,459,466 A * 7/1984 Nakagawa et al. ........... 392/307
5,239,163 A * 8/1993 Brouwers ..................... 219/202
(Continued)

FOREIGN PATENT DOCUMENTS

CN    1937860 A    3/2007
CN    101097092 A    1/2008
(Continued)

OTHER PUBLICATIONS

International Search Report of PCT/JP2011/058417, dated Jun. 28, 2011.
(Continued)

*Primary Examiner* — Jimmy Chou
(74) *Attorney, Agent, or Firm* — Westerman, Hattori, Daniels & Adrian, LLP

(57) ABSTRACT

In a heating-medium heating unit equipped with a first heating-medium circulation box and a second heating-medium circulation box which are in close contact with both surfaces of a PTC heater, in which heating-medium circulation passages are formed in the interior, and which are joined to each other in a liquidtight manner, wherein joining surfaces are sealed with liquid gaskets, the heating-medium circulation passages are provided with joining-surface cooling channels that cool the joining surface which is sealed with a liquid gasket and on which the heat from the PTC heater acts. The joining-surface cooling channels are provided at positions closer to the joining surface than to the PTC heater.

5 Claims, 9 Drawing Sheets

(51) Int. Cl.
  *B60H 1/22* (2006.01)
  *F24H 1/12* (2006.01)
  *F24H 1/00* (2006.01)
  *F24H 3/08* (2006.01)

(52) U.S. Cl.
  CPC ............. *F24H 1/121* (2013.01); *F24H 3/085* (2013.01); *B60H 2001/2265* (2013.01); *B60H 2001/2268* (2013.01); *F24H 2250/04* (2013.01)

(58) Field of Classification Search
  USPC .................. 219/202, 208, 494; 392/495, 496
  See application file for complete search history.

(56) References Cited

U.S. PATENT DOCUMENTS

| | | | |
|---|---|---|---|
| 5,279,459 A * | 1/1994 | Single, II | 237/2 A |
| 5,543,923 A * | 8/1996 | Levers et al. | 356/445 |
| 5,571,432 A * | 11/1996 | Sarbach | 219/202 |
| 5,995,711 A * | 11/1999 | Fukuoka et al. | 392/347 |
| 6,002,105 A * | 12/1999 | Tamada | 219/202 |
| 6,037,567 A * | 3/2000 | Inoue et al. | 219/202 |
| 6,124,570 A * | 9/2000 | Ebner et al. | 219/202 |
| 6,166,351 A * | 12/2000 | Yamamoto | 219/202 |
| 6,259,075 B1 * | 7/2001 | Wu | 219/540 |
| 6,265,692 B1 * | 7/2001 | Umebayahi et al. | 219/202 |
| 6,464,027 B1 * | 10/2002 | Dage | B60H 1/004 123/41.14 |
| 6,472,645 B1 * | 10/2002 | Bohlender | 219/505 |
| 6,477,324 B1 * | 11/2002 | Sun | 392/482 |
| 6,588,496 B2 * | 7/2003 | Nakagawa et al. | 165/42 |
| 6,723,966 B2 * | 4/2004 | Jiang | F24H 9/1863 219/505 |
| 6,952,524 B2 * | 10/2005 | Bissonnette et al. | 392/484 |
| 6,957,013 B2 * | 10/2005 | Zimmer | 392/397 |
| 7,098,426 B2 * | 8/2006 | Bohlender et al. | 219/202 |
| 7,222,667 B2 * | 5/2007 | Fujiki et al. | 165/202 |
| 7,576,305 B2 * | 8/2009 | Zeyen et al. | 219/520 |
| 7,777,161 B2 * | 8/2010 | Zeyen et al. | 219/520 |
| 7,971,799 B2 * | 7/2011 | Colette et al. | 237/12.3 B |
| 7,977,606 B2 * | 7/2011 | Adachi et al. | 219/202 |
| 8,362,406 B2 * | 1/2013 | Bohlender et al. | 219/548 |
| 8,391,695 B2 * | 3/2013 | Arkashovski et al. | 392/484 |
| 8,550,147 B2 * | 10/2013 | Lansinger | 165/41 |
| 2001/0043808 A1 * | 11/2001 | Matsunaga et al. | 392/494 |
| 2002/0011484 A1 * | 1/2002 | Beetz et al. | 219/530 |
| 2003/0183619 A1 * | 10/2003 | Bohlender et al. | 219/494 |
| 2004/0169027 A1 * | 9/2004 | Bohlender et al. | 219/202 |
| 2005/0061798 A1 * | 3/2005 | Uhl | B60H 1/2225 219/494 |
| 2005/0230377 A1 * | 10/2005 | Bohlender et al. | 219/505 |
| 2006/0102335 A1 * | 5/2006 | Fujiki et al. | 165/297 |
| 2007/0068913 A1 * | 3/2007 | Zeyen et al. | 219/201 |
| 2007/0068914 A1 * | 3/2007 | Zeyen et al. | 219/201 |
| 2007/0068927 A1 * | 3/2007 | Bohlender et al. | 219/505 |
| 2008/0000889 A1 * | 1/2008 | Niederer | B60H 1/2221 219/205 |
| 2008/0053981 A1 * | 3/2008 | Adachi et al. | 219/202 |
| 2009/0255914 A1 * | 10/2009 | Bohlender et al. | 219/202 |
| 2010/0044360 A1 * | 2/2010 | Niederer et al. | 219/202 |
| 2011/0062137 A1 * | 3/2011 | Wu | 219/202 |
| 2011/0068090 A1 * | 3/2011 | Bohlender et al. | 219/202 |
| 2011/0233181 A1 * | 9/2011 | Reiss et al. | 219/202 |
| 2012/0085743 A1 * | 4/2012 | Clauss et al. | 219/202 |

FOREIGN PATENT DOCUMENTS

| | | | |
|---|---|---|---|
| CN | 101547803 | | 9/2009 |
| DE | 101 09 734 A1 | | 9/2002 |
| DE | 102008056757 | * | 6/2009 ............... H05B 1/02 |
| EP | 1 026 020 A1 | | 8/2000 |
| JP | 1-133728 U | | 9/1989 |
| JP | 4-65089 A | | 3/1992 |
| JP | 2001-071108 A | | 3/2001 |
| JP | 2002-50455 A | | 2/2002 |
| JP | 2003-101277 A | | 4/2003 |
| JP | 2008-056044 A | | 3/2008 |
| JP | 2008-144911 A | | 6/2008 |
| WO | 2007/108066 A1 | | 9/2007 |

OTHER PUBLICATIONS

Notice of Allowance dated Sep. 3, 2014, issued in corresponding Chinese Patent Application No. 201180004511.5 (2 pages) "The Notice of Allowance has been received".

Japanese Decision to Grant a Patent dated Apr. 1, 2014, issued in Japanese Patent Application No. 2010-093294, w/ English concise statement of relevance.

Japanese Office Action dated Nov. 25, 2014, issued in Japanese Patent Application No. 2014-023661, w/English translation (9 pages).

Chinese Office Action dated Feb. 11, 2014, issued in corresponding Chinese Patent Application No. 201180004511.5, w/English translation, (16 pages).

Extended European Search Report dated Aug. 21, 2013, in corresponding European Application No. 11768722.8 (6 pages).

Extended European Search Report dated Feb. 11, 2015, issued in related application No. 14193599.9 (6 pages).

Office Action dated Feb. 29, 2016, issued in counterpart Chinese Patent Application No. 201410652908.0, with English translation. (13 pages).

Decision to Grant for European Patent Application dated Mar. 3, 2016, issued in counterpart European Patent Application No. 11768722.8. Concise explanation of relevance: "The Decision to Grant a Patent has been received". (1 page).

Notification of Grant of Invention Patent dated Oct. 28, 2016, issued in counterpart Chinese Patent Application No. 201410652908.0. (1 page). Concise Explanation of the Relevance: The Notification on the Grant of Patent Right for Invention has been received.

Non-Final Office Action dated Aug. 19,2016, issued in U.S. Appl. No. 14/549,181. (46 pages).

* cited by examiner

HEATING-MEDIUM HEATING UNIT AND VEHICLE AIR CONDITIONER USING THE SAME

TECHNICAL FIELD

The present invention relates to a heating-medium heating unit that heats a heating medium using a positive temperature coefficient (PTC) heater, and to a vehicle air conditioner using the same.

BACKGROUND ART

One known heating-medium heating unit for heating a medium to be heated uses a PTC heater that uses a positive temperature coefficient thermistor device (PTC device) as a heating element. The PTC heater has a positive temperature thermistor coefficient and thus shows an increasing value of resistance as the temperature increases, which allows the current consumption to be controlled and the increase in temperature to be slowed, and thereafter, the current consumption and the temperature of the heat generating portion reach a saturation region and are stabilized; that is, the PTC heater has a self temperature control characteristic.

The PTC heater has the characteristic that the current consumption is reduced as the temperature of the heater increases, and thereafter when the temperature reaches a saturation region of a fixed temperature, the current consumption stabilizes at a low value. The use of this characteristic provides advantages in that current consumption can be reduced and an abnormal increase in the temperature of the heat generating portion can be prevented.

Therefore, PTC heaters are used in many technical fields. Also in the field of air conditioning, as disclosed in PTL 1, for example, in a hybrid-vehicle air conditioner, a heating-medium heating unit in which the PTC heater is applied to a heating unit for heating a heating medium (here, engine coolant) to be supplied to a radiator for heating air when the engine is stopped has been proposed.

In this heating-medium heating unit, two heating-medium circulation boxes are joined to each other via an O-ring in a liquidtight manner, and a flat PTC heater is closely interposed between the two heating-medium circulation boxes. The heating-medium circulation boxes are each configured such that a plurality of box components are joined via O-rings in a liquidtight manner, and the heating-medium circulation boxes each have therein a circulation path through which engine coolant, which is a heating medium, circulates.

The heating-medium circulation boxes each have a flat radiating surface in close contact with the PTC heater, and a grooved level-difference portion is formed between the flat surface and a joining surface formed on the outer periphery of each heating-medium circulation box (box component) (see FIG. 5 in PTL 1).

This is for the purpose of preventing the O-rings from being overheated by increasing the length of the heat transmission path from the PTC heater to the foregoing O-rings to prevent the O-rings interposed between the joining surfaces from deteriorating in quality due to high heat generated from the PTC heater, which would cause liquid leaks. The level-difference portion is provided with wiring members extending from the PTC heater.

CITATION LIST

Patent Literature

{PTL 1} Japanese Unexamined Patent Application, Publication No. 2008-56044

SUMMARY OF INVENTION

Technical Problem

However, since the heating-medium heating unit described in PTL 1 has a configuration in which a flat PTC heater is closely interposed between a pair of heating-medium circulation boxes configured such that a plurality of box components are joined via O-rings in a liquidtight manner, as described above, a large number of O-rings are needed, thus increasing the number of components, and moreover, complicating the assembly work, and furthermore, needing the carving of fitting grooves in which the O-rings are fitted in the joining surfaces of the box components, which has caused an increase in the manufacturing cost of the heating-medium heating unit.

Furthermore, since level-difference portions, such as grooves, are formed between the radiating surfaces in close contact with the PTC heater and the joining surfaces formed on the outer peripheries of the heating-medium circulation boxes (box components), the number of man-hours for machining the box components is large, which causes an increase in the manufacturing cost of the heating-medium circulation boxes, and thus the entire heating-medium heating unit.

Furthermore, since wiring members extending from the PTC heater are disposed between the PTC heater and the outer peripheries (joining surfaces) of the heating-medium circulation boxes, the dimensions of the outer peripheries of the heating-medium circulation boxes are significantly larger than the area of the flat surface of the PTC heater, which also causes an increase in the manufacturing cost of the heating-medium heating unit.

The present invention has been made in consideration of such circumstances, and an object thereof is to provide a heating-medium heating unit which accommodates a PTC heater, in which the manufacturing cost of heating-medium circulation boxes through which a heating medium circulates is reduced, and in which leakage of the heating medium from the heating-medium circulation boxes is prevented so that the reliability can be enhanced, as well as a vehicle air conditioner using the same.

Solution to Problem

To achieve the above object, the present invention provides the following solutions.

A heating-medium heating unit according to a first aspect of the present invention includes a flat PTC heater; a first heating-medium circulation box in which a plurality of box components are stacked one on another, which is in close contact with one surface of the PTC heater, and in which a heating-medium circulation passage is formed in the interior; and a second heating-medium circulation box in which a plurality of box components are similarly stacked on one another, which is in close contact with the other surface of the PTC heater, in which a heating-medium circulation passage is formed in the interior, and which is joined to the first heating-medium circulation box in a liquidtight manner, wherein a heating medium that circulates through the heating-medium circulation passages in the first and second heating-medium circulation boxes is heated by heat radiated from both surfaces of the PTC heater, wherein at least one of a joining surface between the box components that constitute the first heating-medium circulation box and the second heating-medium circulation box and a joining surface between the first heating-medium circulation box and the second heating-medium circulation box is sealed with a liquid gasket; and wherein the heating-medium circulation passage of at least the first heating-medium circulation box or the second heating-medium circulation box is provided with a joining-surface cooling channel that is sealed with the liquid gasket and that cools the joining surface on which the heat from the PTC heater acts.

With the heating-medium heating unit, the heating-medium heating unit can be assembled by sealing spaces between the plurality of box components constituting the heating-medium heating unit using only liquid gaskets. The two heating-medium circulation boxes can also be assembled with the space therebetween being sealed using only a liquid gasket. This can therefore eliminate a large number of O-rings used in the related art, thus reducing the number of components and assembly man-hours, and moreover, can eliminate fitting grooves that are conventionally carved in the individual joining surfaces of the box components to fit the O-rings therein, thereby reducing the number of man-hours for machining the box components, thus allowing the manufacturing cost of the heating-medium circulation boxes to be reduced.

Moreover, since the liquid gaskets applied to the joining surfaces can be protected from the heat from the PTC heater by using the cooling channel provided in the heating-medium circulation passage of at least the first heating-medium circulation box or the second heating-medium circulation box, the durability of the liquid gasket is enhanced, and thus leakage of the heating medium from the joining surface can be prevented.

In the heating-medium heating unit according to the first aspect of the present invention, preferably, the joining-surface cooling channel is provided at a position closer to the joining surface sealed with the liquid gasket than to the PTC heater. This allows the liquid gasket applied to the joining surface to be protected from the heat from the PTC heater more reliably.

In the heating-medium heating unit according to the first aspect of the present invention, preferably, the joining surface is provided with an outside sealing section that seals a space between the heating-medium circulation passage and the outside and a board sealing section that seals a space between the heating-medium circulation passage and a portion communicating with a portion accommodating a board for controlling the PTC heater, in which the width of the board sealing section is larger than the width of the outside sealing section. This can reliably prevent coolant leakage to the control board while eliminating the O-ring so that the manufacturing cost can be reduced, thereby enhancing the reliability of the heating-medium heating unit.

In the heating-medium heating unit according to the first aspect of the present invention, preferably, a radiating surface of at least one of the first heating-medium circulation box and the second heating-medium circulation box, the radiating surface being in close contact with the PTC heater, and the joining surface between the first heating-medium circulation box and the second heating-medium circulation box are formed as a continuous flat surface without a level-difference. This can remarkably simplify machining of at least the first or second heating-medium circulation box, thus reducing the manufacturing cost of the heating-medium circulation box.

Furthermore, in the heating-medium heating unit according to the first aspect of the present invention, preferably, the PTC heater and the first and second heating-medium circulation boxes are formed in a rectangular shape, and a wiring member of the PTC heater extends from an end of the PTC heater in the longitudinal direction. This can eliminate the wiring members of the PTC heater interposed between the long side of the PTC heater and the long side of the heating-medium circulation box, and hence the outer peripheral dimensions of the heating-medium circulation box can be brought close to the planar outside dimensions of the PTC heater, and in addition, the heating-medium circulation box can be made compact, and thus the manufacturing cost can be reduced.

In the heating-medium heating unit, preferably, PTC devices that constitute the PTC heater are disposed in a plurality of rows along the channel direction of the heating-medium circulation passages, the plurality of PTC heaters have different widths, and ON/OFF states of the PTC devices can be individually controlled. With this configuration, the wiring members of the PTC heater can be easily provided together at one end of the PTC heater in the longitudinal direction, the amount of heat from the PTC heater can be controlled with a simple configuration, and thus a reduction in the manufacturing cost due to the size reduction of the heating-medium heating unit and enhanced reliability can be achieved.

Furthermore, a vehicle air conditioner according to a second aspect of the present invention includes a blower that circulates outside air or vehicle interior air, a cooler provided downstream of the blower, and a radiator provided downstream of the cooler, wherein a heating medium heated by the heating-medium heating unit according to the first aspect can circulate through the radiator. This can enhance the reliability while reducing the manufacturing cost of the heating-medium heating unit.

Advantageous Effects of Invention

Thus, with the heating-medium heating unit according to the present invention and the vehicle air conditioner using the same, it is possible to reduce the manufacturing cost of the heating-medium circulation box which accommodates a PTC heater and through which a heating medium circulates, and to prevent leakage of the heating medium from the heating-medium circulation box, and hence the reliability can be enhanced.

DESCRIPTION OF EMBODIMENT

An embodiment of the present invention will be described hereinbelow using FIGS. 1 to 9.

Figure 1:
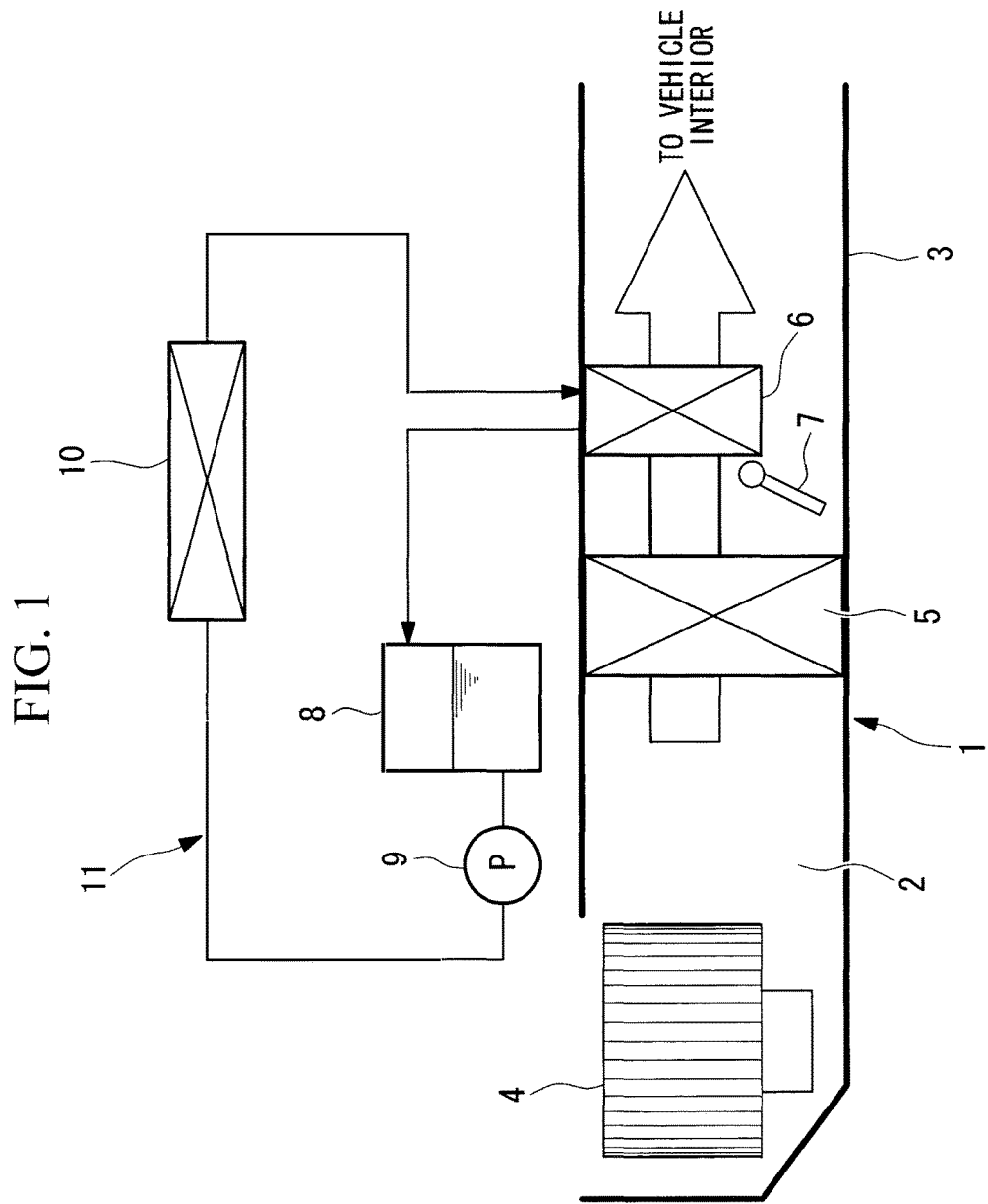
FIG. 1 is a schematic configuration diagram of a vehicle air conditioner according to an embodiment of the present invention.

FIG. 1 shows a schematic configuration diagram of a vehicle air conditioner 1 according to this embodiment. The vehicle air conditioner 1 is, for example, a hybrid-vehicle air conditioner and is equipped with a casing 3 forming an air channel 2 through which outside air or vehicle interior air is taken in, controls the temperature thereof, and guides it into the vehicle interior.

The casing 3 accommodates, in sequence from the upstream side to the downstream side of the air channel 2, a blower 4 that takes in outside air or vehicle interior air, increases the pressure thereof, and blows it downstream; a cooler 5 that cools the air blown by the blower 4; a radiator 6 that heats the air cooled by passing through the cooler 5; and an air mix damper 7 that adjusts the ratio of the amount of air passing through the radiator 6 to the amount of flowing air bypassing the radiator 6 to control the temperature of the air mixed downstream thereof.

The downstream side of the casing 3 is connected to a plurality of vents (not shown) through which the temperature-controlled air is blown out into the vehicle interior via a blowing-mode switching damper and a duct (not shown). The cooler 5 constitutes a refrigerant circuit together with a compressor, a condenser, and an expansion valve (not shown) and cools air passing therethrough by evaporating a refrigerant that is adiabatically expanded at the expansion valve.

The radiator 6 constitutes a heating-medium circulating circuit 11 together with a tank 8, a pump 9, an engine (not shown), and a heating-medium heating unit 10 according to the present invention. Engine coolant of a hybrid vehicle is used as a heating medium flowing through the heating-medium circulating circuit 11. The heating-medium circulating circuit 11 heats the air passing through the radiator 6 in the casing 3 by heating the engine coolant with the heating-medium heating unit 10 when the temperature of the engine coolant, serving as the heating medium, does not significantly increase, such as during hybrid driving, and by circulating the heated engine coolant through the heating-medium circulating circuit 11 with the pump 9.

Figure 2:
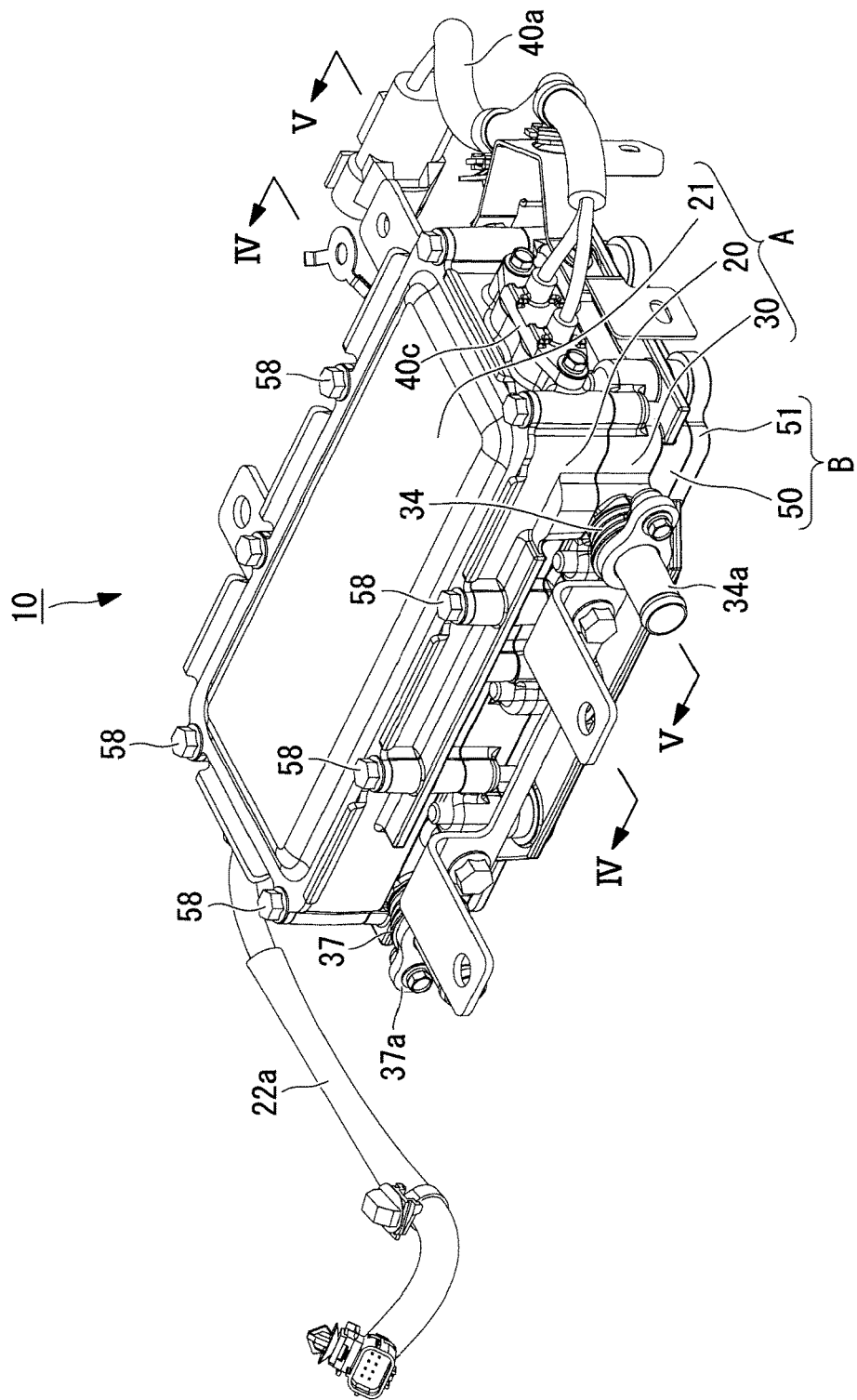
FIG. 2 is a perspective view of a heating-medium heating unit according to an embodiment of the present invention.
Figure 3:
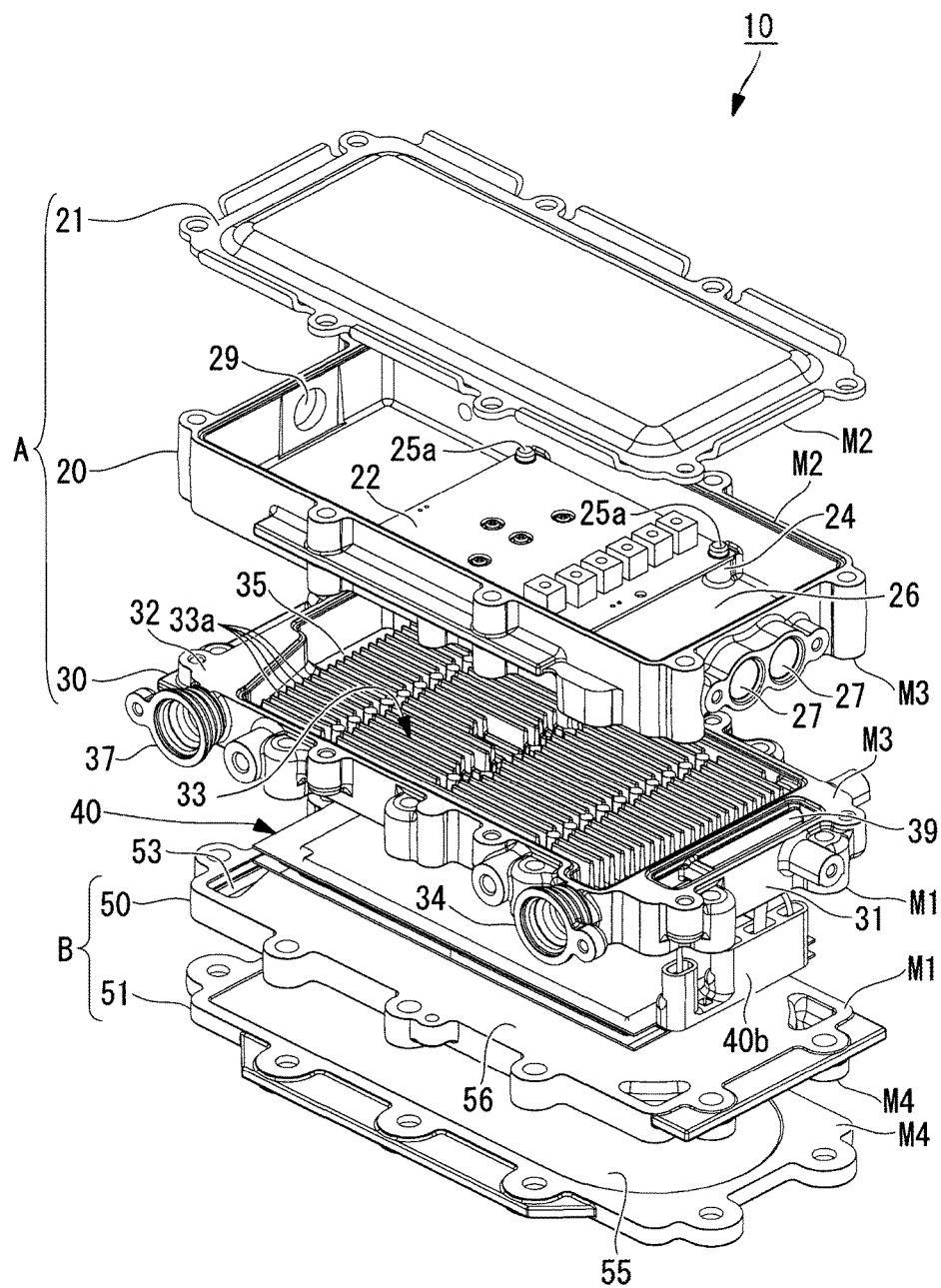
FIG. 3 is an exploded perspective view of the heating-medium heating unit according to the embodiment of the present invention.
Figure 4:
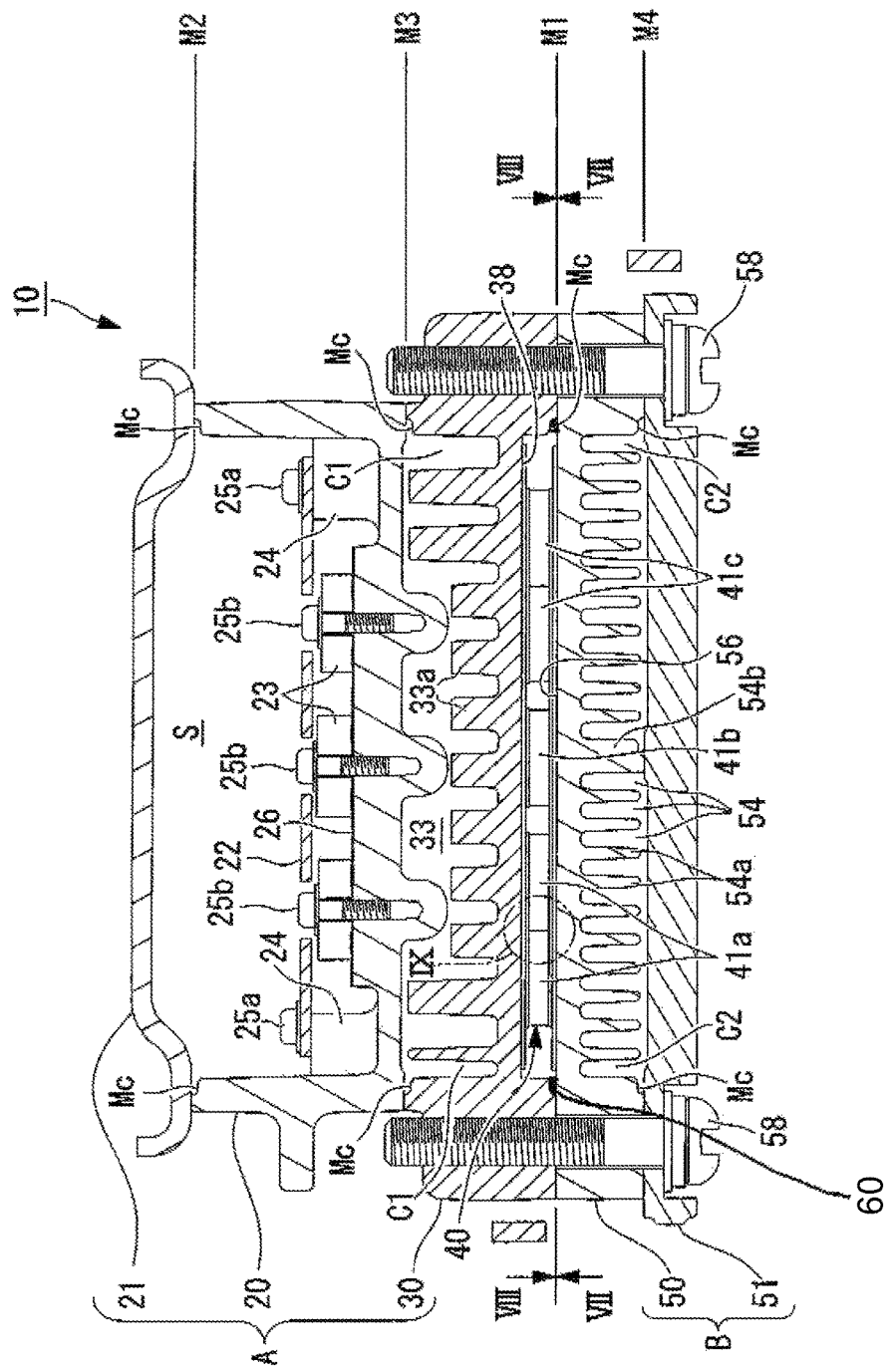
FIG. 4 is a vertical cross-sectional view taken along line IV-IV in FIG. 2.
Figure 5:
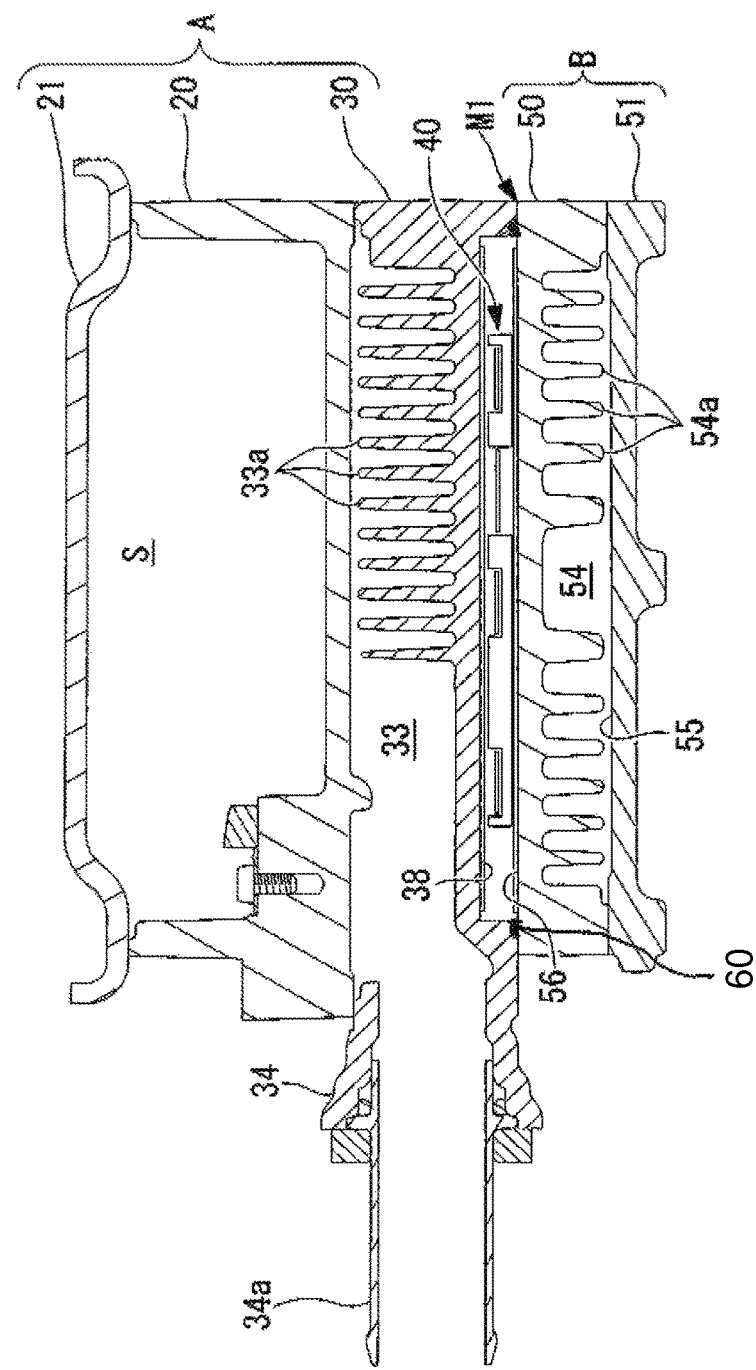
FIG. 5 is a vertical cross-sectional view taken along line V-V in FIG. 2.

FIG. 2 shows a perspective view of the heating-medium heating unit 10; FIG. 3 shows an exploded perspective view of the heating-medium heating unit 10; and FIGS. 4 and 5 show vertical cross-sectional views of the heating-medium heating unit 10.

The heating-medium heating unit 10 is equipped with a first heating-medium circulation box A configured like a casing such that a plurality of box components 20, 21, and 30 are stacked one on another; a second heating-medium circulation box B which is configured like a casing such that a plurality of box components 50 and 51 are similarly stacked one on another and which is joined to the lower surface of the first heating-medium circulation box A in a liquidtight manner; and a PTC heater 40 sandwiched between the first and second heating-medium circulation boxes A and B.

The first heating-medium circulation box A is formed such that the rectangular board-accommodating box 20, to the upper surface of which the cap 21 is joined, and the upper heating-medium circulation box 30 having the same rectangular shape as the board-accommodating box 20 are joined together in a liquidtight manner. The second heating-medium circulation box B is formed of the lower heating-medium circulation box 50 having the same rectangular shape as the upper heating-medium circulation box 30 and the cap 51, which is joined to the lower surface of the lower heating-medium circulation box 50 in a liquidtight manner. The first heating-medium circulation box A, the second heating-medium circulation box B, and the other box components 20, 21, 30, 50, and 51 are tightened together with a plurality of bolts 58 to form a single unit, as shown in FIG. 2 and FIG. 4.

The PTC heater 40 has a rectangular, flat shape smaller than those of the upper heating-medium circulation box 30 and the lower heating-medium circulation box 50, the upper surface of the PTC heater 40 is in close contact with a flat radiating surface 38 formed at the lower surface of the upper heating-medium circulation box 30, and the lower surface of the PTC heater 40 is in close contact with a flat radiating surface 56 formed on the upper surface of the lower heating-medium circulation box 50, as will be described later in detail.

The board-accommodating box 20 is a rectangular half casing which is formed of a thermally conducting material, such as an aluminum alloy, whose upper surface is tightly sealed by the cap 21, and whose interior serves as a board-accommodating space S, in which a control board 22 (see FIGS. 3 and 4) that controls the PTC heater 40 is accommodated. The control board 22 incorporates heat generating components and control circuits, such as field effect transistors (FETs) 23, and is supplied with a high voltage of 300 V for driving the PTC heater 40 and a low voltage of 12 V for control.

The control board 22 is fixedly disposed on supporting portions 24 projecting from the bottom surface of the board-accommodating box 20 by being fastened with screws 25a at the four corners. The heat generating components, such as the FETs 23, are disposed on the lower surface side of the control board 22 and are fastened and fixed with screws 25b to the upper surface of a cooling portion 26 provided on the bottom surface of the board-accommodating box 20 that is in contact therewith via an insulating layer (not shown) therebetween. The heat generating components, such as the FETs 23, and the cooling portion 26 are disposed in the vicinity of the inlet of heating-medium circulation passages (circulation paths 33), described later, provided in the upper heating-medium circulation box 30, to enhance the cooling effect on the heat generating components.

Wire insertion holes 27 are formed at one end face of the board-accommodating box 20 (see FIGS. 3 and 6), through which wiring members 40a (see FIG. 2) connected to the control board 22 are passed. Wire routing holes 28 (see FIG. 6) through which a harness connecting the control board 22 and the PTC heater 40 passes are formed in the lower surface at one end of the board-accommodating box 20. A harness insertion hole 29 (see FIG. 3) is formed at the other end of the board-accommodating box 20, through which an electrical harness 22a (see FIG. 2) connecting to the control board 22 passes.

FIGS. 3 to 5 and FIG. 7 illustrate the heating-medium circulation passages in the upper heating-medium circulation box 30. The upper heating-medium circulation box 30 is a rectangular half casing which is formed of a thermally conducting material, such as an aluminum alloy, and whose upper surface is provided with a pair of inlet header 31 and outlet header 32 formed at both ends and parallel grooved circulation paths 33, which are formed between the inlet header 31 and the outlet header 32 and are separated by a large number of fins 33a. The upper surfaces of the inlet header 31, the outlet header 32, and the circulation paths 33 are sealed off by the bottom surface of the board-accommodating box 20 in a liquidtight manner (see FIGS. 4 and 5).

Thus, an engine-coolant circulation passage through which the engine coolant flowing into the inlet header 31 is distributed to the large number of circulation paths 33 so as to flow simultaneously in parallel in the circulation paths 33 toward the outlet header 32 is formed between the board-accommodating box 20 and the upper heating-medium circulation box 30. The engine coolant flowing in the circulation paths 33 does not flow directly into the outlet header 32 but flows into a circulation opening 35 (see FIG. 7), described later, formed in the lower surface of the upper heating-medium circulation box 30. The above-described cooling portion 26 formed on the bottom surface of the board-accommodating box 20 is cooled by the engine coolant circulating in the circulation paths 33, described above, and thus constitutes a cooling structure for the control board 22.

The inlet header 31 is provided with an engine-coolant inflow portion 34, and the outlet header 32 is provided with the circulation opening 35 connecting to the lower heating-medium circulation box 50, a circulation opening 36 through which the engine coolant flowing from the lower heating-medium circulation box 50 is made to flow outwards, as will be described later, and an engine-coolant outflow portion 37 communicating with the outside via the circulation opening 36. The inflow portion 34 and the outflow portion 37 are provided with respective union members 34a and 37a (see FIGS. 2 and 5) that allow hose members constituting the heating-medium circulating circuit 11 to be connected thereto.

Furthermore, the lower surface of the upper heating-medium circulation box 30 is provided with a wide depressed portion (see FIGS. 4, 5 and 7) whose ceiling surface serves as the flat radiating surface 38 that is in close contact with the upper surface of the PTC heater 40. This depressed portion faces the back surfaces of the circulation paths 33 through which the engine coolant circulates and is formed such that the PTC heater 40 is fitted therein. Wire insertion holes 39 (see FIG. 3) are formed at the end of the upper surface of the upper heating-medium circulation box 30 opposite to the circulation openings 35 and 36, and the wire insertion holes 39 match the wire routing holes 28 of the board-accommodating box 20.

FIGS. 3 to 5 and FIG. 8 illustrate heating-medium circulation passages in the lower heating-medium circulation box 50. The lower heating-medium circulation box 50 is a rectangular half casing which is constituted by a thermally conducting material, such as an aluminum alloy, in which communication openings 52 and 53 (see FIG. 8) are provided at one end thereof, and the communication openings 52 and 53 match the circulation openings 35 and 36 of the upper heating-medium circulation box 30, respectively.

The lower surface of the lower heating-medium circulation box 50 is provided with parallel grooved circulation paths 54 that extend from the communication opening 52 toward the other end and that make a U-turn at the other end to return to the communication opening 53 and that are separated by a large number of fins 54a (see FIG. 4). The supply channels and the return channels of the U-shaped circulation paths 54 are separated by a partition wall 54b (see FIG. 4) higher than the fins 54a. The lower surfaces of the circulation paths 54 are tightly sealed by the cap 51, as described above, and the cap 51 has a U-shaped shallow depressed portion 55 (see FIG. 3) that matches the shapes of the circulation paths 54 and the partition wall 54b.

Thus, a heating-medium circulation passage through which the engine coolant flowing into the communication opening 52 is distributed from the communication opening 52 to the large number of circulation paths 54, circulates in the individual circulation paths 54 simultaneously in parallel, and makes a U-turn at the other end to reach the communication opening 53 is formed between the lower heating-medium circulation box 50 and the cap 51.

The communication opening 52 of the lower heating-medium circulation box 50 communicates with the circulation opening 35 provided in the outlet header 32 of the upper heating-medium circulation box 30 so that the engine coolant flowing in the circulation paths 33 of the upper heating-medium circulation box 30 flows therein. The communication opening 53 of the lower heating-medium circulation box 50 communicates with the circulation opening 36 provided in the outlet header 32 of the upper heating-medium circulation box 30 to constitute a passage through which the engine coolant flowing in the lower heating-medium circulation box 50 is made to flow outwards from the circulation opening 36 via the outflow portion 37.

The upper surface of the lower heating-medium circulation box 50 serves as the radiating surface 56 (see FIGS. 3 to 5 and FIG. 8) and holds the PTC heater 40 with the flat radiating surface 38 at the lower surface of the upper heating-medium circulation box 30 therebetween like a sandwich, so that the radiating surfaces 38 and 56 are in pressure-contact with compressive heat conducting layers 44, to be described later, bonded to both surfaces of the PTC heater 40.

FIGS. 3 and 4 and FIGS. 7 to 9 illustrate the configuration of the PTC heater 40. The PTC heater 40 is rectangular in overall shape. The PTC heater 40 is constituted by PTC devices 41a, 41b, and 41c serving as heat-generating elements, disposed in, for example, three rows, along the channel direction of the heating-medium circulation passages (circulation paths 33 and circulation paths 54). Of the three PTC devices 41a, 41b, and 41c, the PTC devices 41a and 41c at both ends are set to be, for example, twice as wide as the PTC device 41b at the center.

Figure 9:
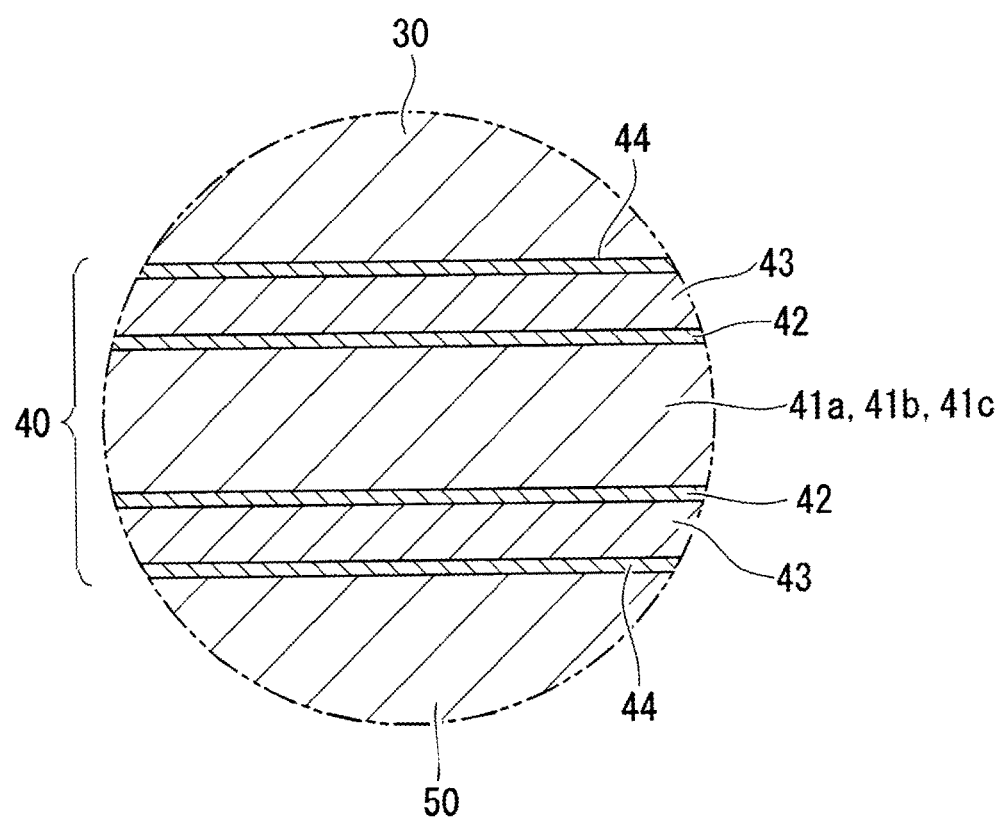
FIG. 9 is an enlarged diagram of part IX in FIG. 4.

As shown in an enlarged cross-sectional view in FIG. 9, the PTC devices 41a, 41b, and 41c each have a stacked structure in which electrode plates 42, noncompressive insulating layers 43, and the compressive heat conducting layers 44 are stacked in sequence. The PTC devices 41a, 41b, and 41c are configured such that the ON/OFF states thereof can be individually controlled by control circuits incorporated in the control board 22.

The electrode plates 42 are for supplying electric power to the PTC devices 41a, 41b, and 41c, are rectangular thin plates similar to the PTC devices 41a, 41b, and 41c, and have electrical conductivity and thermal conductivity. The noncompressive insulating layers 43 are rectangular thin plates, are each constituted by an insulating material, such as a polyamide film, and have thermal conductivity. The noncompressive insulating layers 43 are 0.1 mm or less in thickness. This is for the purpose of minimizing the thermal resistance between the PTC devices 41a, 41b, and 41c and the electrode plates 42 and between the upper heating-medium circulation box 30 (radiating surface 56) and the lower heating-medium circulation box 50 (radiating surface 38) provided at the outside thereof and for providing sufficient electrical insulation.

Furthermore, the compressive heat conducting layers 44 are rectangular sheet members having compressibility, which are constituted by insulating sheets, such as silicone sheets and have thermal conductivity. The compressive heat conducting layers 44 are, if constituted by silicone sheets, set to be about 0.4 mm to 2.0 mm in thickness to reduce the thermal resistance between the PTC device 41 serving as a heat-generating element and the upper heating-medium circulation box 30 (radiating surface 38) and the lower heating-medium circulation box 50 (radiating surface 56). The thickness of at least 0.4 mm or more ensures a compressing function, allowing the upper heating-medium circulation box 30 and the lower heating-medium circulation box 50 to be reliably brought into close contact with the PTC heater 40 by using the compressibility when the PTC heater 40 is mounted between the upper heating-medium circulation box 30 and the lower heating-medium circulation box 50, and allowing the mounting dimensional tolerance to be absorbed.

Thus, as shown in FIGS. 4 and 5, the PTC heater 40 can heat the engine coolant circulating in the upper heating-medium circulation box 30 and the lower heating-medium circulation box 50 provided in close contact with both sides thereof by radiating the heat from both sides.

The PTC heater 40 has wiring members 40b at one end thereof, and the wiring members 40b are bent upwards at right angles to the planar direction of the PTC heater 40 and are inserted into the wire insertion holes 39 of the upper heating-medium circulation box 30 and the wire routing holes 28 of the board-accommodating box 20. The wiring members 40b are guided to the control board 22, so that the cable-like wiring members 40a (see FIG. 2) are drawn outwards from the control board 22 through the wire insertion holes 27 of the board-accommodating box 20, as described above. The wire insertion holes 27 are fitted with a waterproof, dustproof wire cap 40c.

The heating-medium circulating circuit 11 is connected to the inflow portion 34 of the upper heating-medium circulation box 30. Low-temperature engine coolant pumped from the pump 9 flows through the inflow portion 34 into the inlet header 31 and is distributed to the individual circulation paths 33 (see FIG. 3). The engine coolant flowing through the circulation paths 33 toward the outlet header 32 is heated and increased in temperature by the PTC heater 40, joins before the outlet header 32, and flows into the communication opening 52 of the lower heating-medium circulation box 50 through the circulation opening 35.

Figure 8:
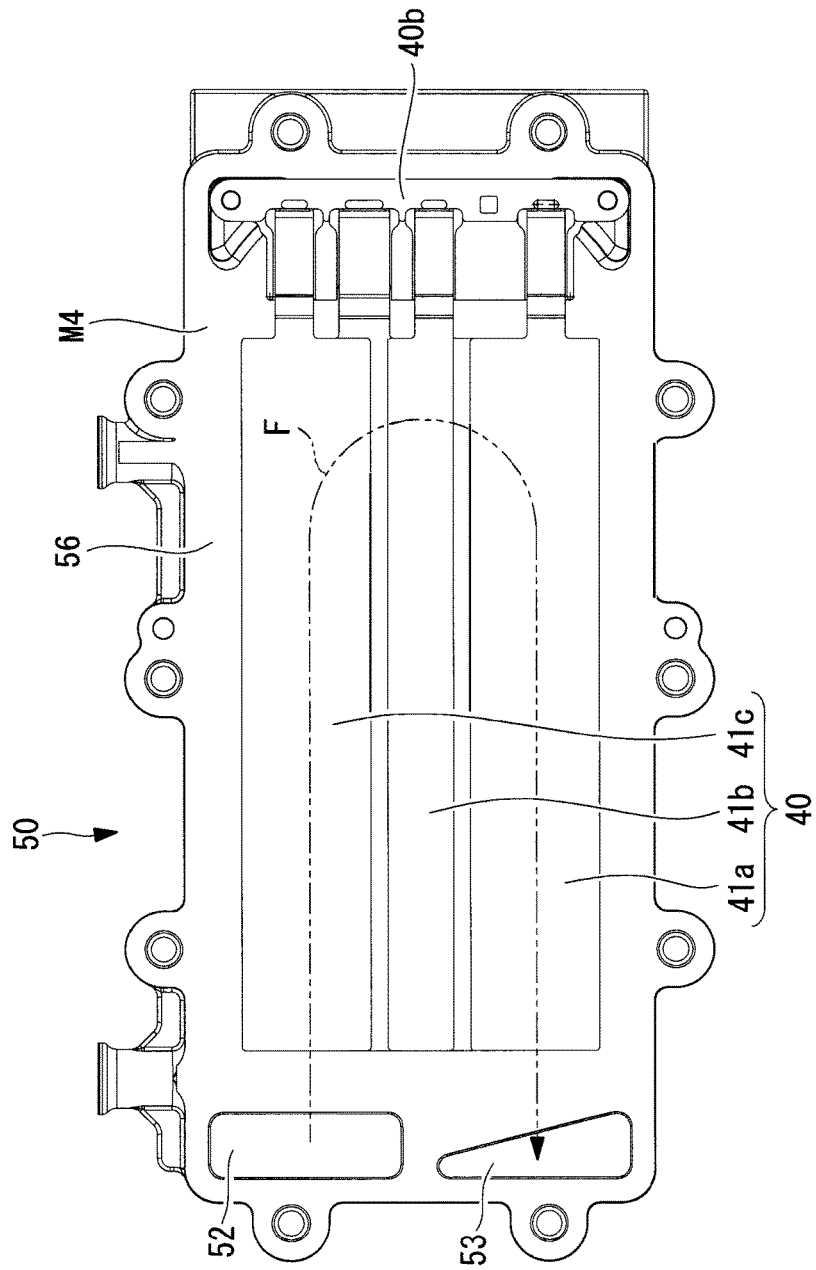
FIG. 8 is a top view of a lower heating-medium circulation box taken along arrows VIII-VIII in FIG. 4.

The engine coolant diverges at the communication opening 52 into the individual circulation paths 54, flows as indicated by an imaginary line F in FIG. 8 while being heated and increased in temperature again by the PTC heater 40, makes a U-turn at the other end, passes through the communication opening 53 and then the circulation opening 36 of the upper heating-medium circulation box 30 and enters the outlet header 32, passes through the outflow portion 37, and flows back to the heating-medium circulating circuit 11. Thus, the engine coolant passing through the interior of the heating-medium heating unit 10 flows along both surfaces of the PTC heater 40 and circulates in the heating-medium circulating circuit 11 while being heated by the heat from the PTC heater 40, so that the temperature of the vehicle interior is controlled.

Since the PTC devices 41a, 41b, and 41c that constitute the PTC heater 40 are configured such that the ON/OFF states can be individually controlled by the control circuits incorporated in the control board 22, the individual PTC devices 41a, 41b, and 41c are independently turned ON and OFF by the control board 22 according to the difference between the actual temperature of the engine coolant flowing into the heating-medium heating unit 10 and a necessary temperature (target temperature), and thus the heating capability is controlled. This allows the engine coolant to flow out while being heated and increased to a predetermined temperature.

Next, the relevant part of the present invention will be described. As shown in FIG. 4, the heating-medium heating unit 10 has a plurality of joining surfaces M1 to M4. Joining surfaces between the first heating-medium circulation box A and the second heating-medium circulation box B, that is, a joining surface M1 between the upper heating-medium circulation box 30 and the lower heating-medium circulation box 50, joining surfaces M2 and M3 between the board-accommodating box 20 and the cap 21 and the upper heating-medium circulation box 30 that constitute the first heating-medium circulation box A, and a joining surface M4 between the lower heating-medium circulation box 50 and the cap 51 that constitute the second heating-medium circulation box B, are configured to be sealed with liquid gaskets 60. Examples of the liquid gaskets 60 include a waterproof, heat-resistant silicone sealant that becomes rubbery when it hardens.

Furthermore, the circulation paths 33 that serve as the heating-medium circulation passages of the first heating-medium circulation box A and the circulation paths 54 that serve as the heating-medium circulation passages of the second heating-medium circulation box B are provided with joining-surface cooling channels C1 and C2, respectively. These joining-surface cooling channels C1 and C2 are provided to particularly cool, of the joining surfaces M1 to M4 sealed by the liquid gaskets 60, the vicinity of the joining surface M1, on which a considerable amount of the heat from the PTC heater 40 acts, thereby preventing the liquid gasket 60 applied to the joining surface M1 from being degraded due to the heat.

The joining-surface cooling channel C1 constitutes, of the plurality of circulation paths 33, one or two circulation paths close to the joining surface M1, and the joining-surface cooling channel C2 constitutes, of the plurality of circulation paths 54, one or two circulation paths close to the joining surface M1. These joining-surface cooling channels C1 and C2 are provided at positions closer to the joining surface M1 than to the edge of the PTC heater 40. Therefore, the heat from the PTC heater 40 is subjected to heat exchange by the engine coolant that flows through the joining-surface cooling channels C1 and C2 before being transmitted to the joining surface M1, which makes the heat difficult to be transmitted to the joining surface M1. Accordingly, this allows the liquid gasket 60 that seals the joining surface M1 to be protected from the heat, thus enhancing the durability, which prevents the heating medium from leaking through the joining surface M1.

Figure 6:
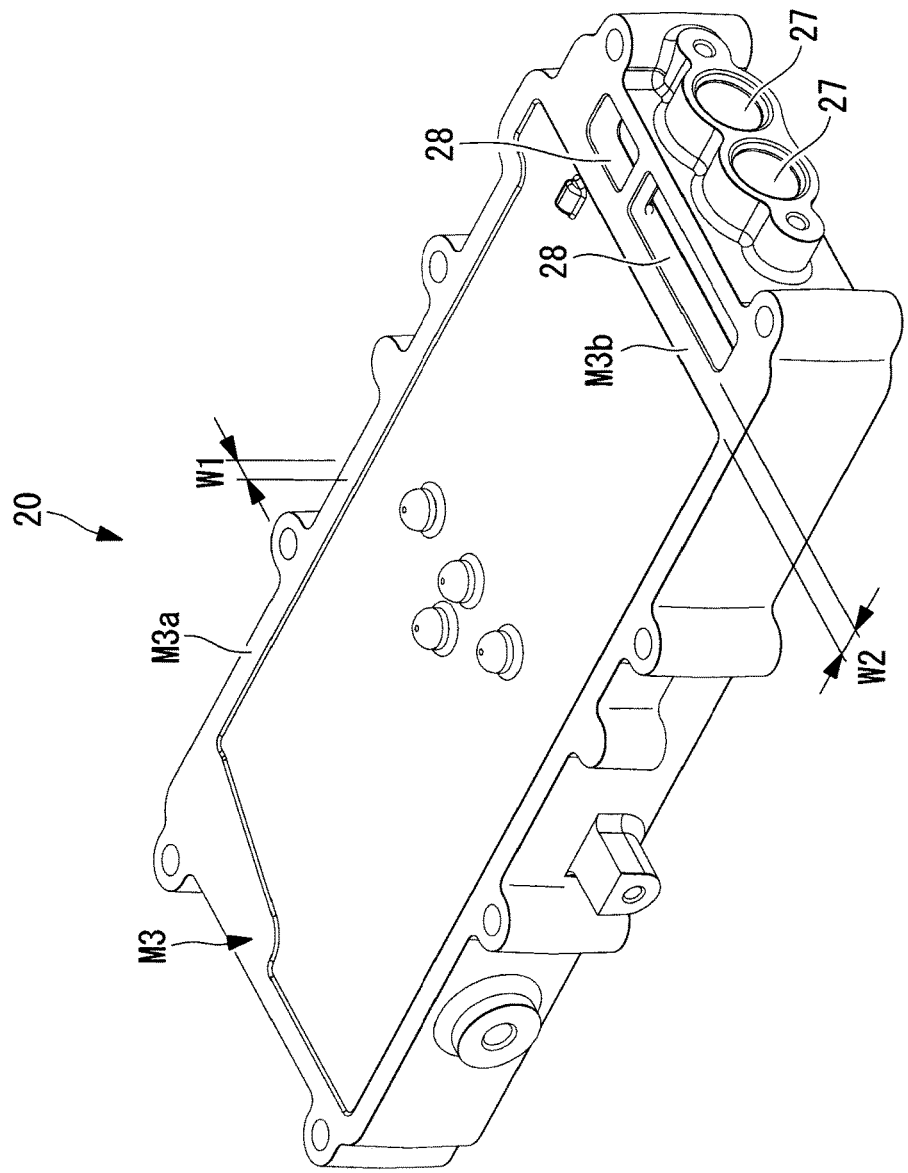
FIG. 6 is a perspective view of a board-accommodating box shown in FIG. 3, turned upside down.
Figure 7:
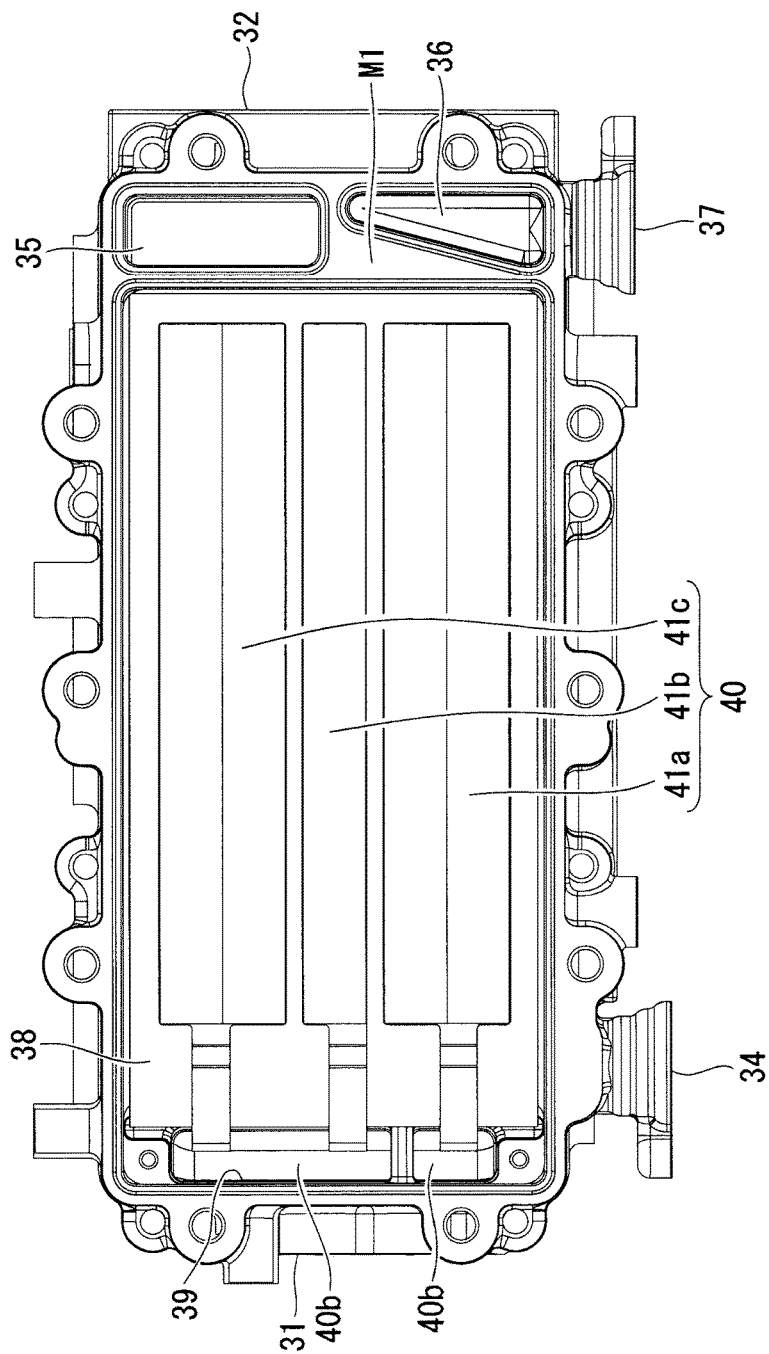
FIG. 7 is a bottom view of an upper heating-medium circulation box taken along arrows VII-VII in FIG. 4.

Of the joining surfaces M1 to M4, the joining surface M3 between the lower surface of the board-accommodating box 20 and the upper surface of the upper heating-medium circulation box 30, through which the wiring members 40b of the PTC heater 40 pass, includes an outside sealing section M3a that seals a space between the heating-medium circulation passages (circulation paths 33) and the outside and a board sealing section M3b that seals a space between the heating-medium circulation passages (circulation paths 33) and the wire routing holes 28, which are portions communicating with the board-accommodating space S, as shown in FIG. 6, which illustrates the shape of the lower surface of the board-accommodating box 20. The width W2 of the board sealing section M3b is set to be larger than the width W1 of the outside sealing section M3a. For example, W1 is set at 5 mm, and W2 is set at 8 mm.

As shown in FIG. 4, either one of the upper and lower surfaces of the individual joining surfaces M1 to M4 are each provided with a level-difference portion Mc along the inner peripheral edge thereof. Forming the level-difference portions Mc allows the liquid gasket 60 to be maintained at a predetermined thickness by the level-difference portion Mc and to be able to harden without being subjected to a pressing force. If both surfaces of the individual joining surfaces M1 to M4 were made flat without the flat level-difference portion Mc, the liquid gaskets 60 applied therebetween would be completely pushed out from the range of the joining surfaces when a pressing force is applied thereto, thus posing a worry that sufficient sealability would not be maintained. The height of the level-difference portion Mc may be about 0.5 mm to 2.0 mm.

As shown in FIGS. 3, 4, and 8, for example, in the lower heating-medium circulation box 50 constituting the second heating-medium circulation box B, the radiating surface 56 in close contact with the PTC heater 40 and the joining surface M1 between it and the first heating-medium circulation box A are formed as a continuous flat surface without a level-difference.

The heating-medium heating unit 10 according to this embodiment is configured as described above. This heating-medium heating unit 10 provides the following advantages.

First, since the joining surfaces M1 to M4 between the box components 20, 21, 30, 50, and 51 that constitute the first heating-medium circulation box A and the second heating-medium circulation box B are configured to be sealed with the liquid gaskets 60, the O-rings that are conventionally interposed between the joining surfaces M1 to M4 can be eliminated. This can reduce the number of components and the number of man-hours for assembling the heating-medium heating unit 10, and moreover, can eliminate fitting grooves that are conventionally carved in the individual joining surfaces M1 to M4 to fit the O-rings therein, thereby reducing the number of man-hours for machining the box components 20, 21, 30, 50, and 51, thus allowing the manufacturing cost of the heating-medium circulation box 10 to be remarkably reduced.

Since the joining-surface cooling channels C1 and C2 are provided in the heating-medium circulation passages (circulation paths 33 and 54) of the first heating-medium circulation box A and the second heating-medium circulation box B, of the four joining surfaces M1 to M4 sealed with the liquid gaskets 60, the joining surface M1 on which a considerable amount of the heat from the PTC heater 40 acts can be cooled favorably. This can therefore prevent the liquid gasket 60 applied to the joining surface M1 from being degraded due to heat, and realizes a sealing technique only with the liquid gasket 60 without using an O-ring, thus significantly contributing to a reduction in the manufacturing cost of the heating-medium heating unit 10.

Furthermore, since these joining-surface cooling channels C1 and C2 are provided at positions closer to the joining surface M1 than to the edge of the PTC heater 40, the liquid gasket 60 applied to the joining surface M1 can be more reliably protected from the heat from the PTC heater 40. For the joining surfaces M3 and M4, since the positions of the circulation paths 33 and 54 are closer to the joining surfaces M3 and M4 than to the PTC heater 40, it is difficult for the joining surfaces M3 and M4 to be affected by the heat from the PTC heater 40.

The shapes of the joining-surface cooling channels C1 and C2 are not limited to those of this embodiment; they may be other shapes. For example, in this embodiment, although the depths and widths of the joining-surface cooling channels C1 and C2 are equal to or smaller than those of the adjacent circulation paths 33 and 54, the depths and widths may be larger than those of the circulation paths 33 and 54 so that much more engine coolant will flow through a portion closer to the joining surface M1, thereby further enhancing the cooling performance of the joining surface M1.

Furthermore, in this heating-medium heating unit 10, of the joining surfaces M1 to M4, the joining surface M3 through which the wiring members 40b of the PTC heater 40 pass is configured such that the width W2 of the board sealing section M3b is set to be larger than the width W1 of the outside sealing section M3a; therefore, while the O-ring on the joining surface M3 is eliminated so that the manufacturing cost can be reduced, coolant leakage to the board-accommodating space S in which the control board 22 is accommodated can be reliably prevented, and hence the reliability of the heating-medium heating unit 10 can be enhanced.

Furthermore, in this heating-medium heating unit 10, since the radiating surface 56 of the lower heating-medium circulation box 50 that constitutes the second heating-medium circulation box B and the joining surface M1 to the first heating-medium circulation box A are formed as a continuous flat surface without a level-difference, the upper surface of the lower heating-medium circulation box 50 can be made completely flat, thereby remarkably facilitating processing of the lower heating-medium circulation box 50, thus reducing the manufacturing cost of the heating-medium circulation box 10.

Furthermore, in this heating-medium heating unit 10, since the PTC heater 40, the first heating-medium circulation box A, and the second heating-medium circulation box B are formed in a rectangular shape, and the wiring members 40b of the PTC heater 40 are extended together from the end of the PTC heater 40 in the longitudinal direction, the wiring members of the PTC heater 40 are not interposed between the long side of the PTC heater 40 and the long side of the heating-medium circulation box 10 as in the related art. Therefore, the outer peripheral dimensions of the heating-medium circulation box 10 can be brought close to the planar outside dimensions of the PTC heater 40, and the width dimension of the heating-medium circulation box 10 can be reduced, and thus the manufacturing cost can be reduced.

Furthermore, in this heating-medium heating unit 10, since the PTC devices 41a, 41b, and 41c that constitute the PTC heater 40 are disposed in a plurality of rows along the channel direction of the heating-medium circulation passages (circulation paths 33 and 54), the plurality of PTC devices 41a, 41b, and 41c have different widths, and the ON/OFF states of the PTC devices 41a, 41b, and 41c can be individually controlled, the wiring members 40b can be easily provided together at one end of the PTC devices 41a, 41b, and 41c in the longitudinal direction, the quantity of heat from the PTC heater 40 can be controlled with a simple configuration, and thus a reduction in the manufacturing cost due to the size reduction of the heating-medium heating unit 10 and enhanced reliability can be achieved.

Furthermore, since the vehicle air conditioner 1 according to the present invention is provided with the blower 4 that circulates outside air or vehicle interior air, the cooler 5 provided downstream of the blower 4, and the radiator 6 provided downstream of the cooler 5 and is configured to circulate engine coolant heated by the heating-medium heating unit 10 according to the present invention through the radiator 6, the reliability of the heating-medium heating unit 10 can be enhanced, and furthermore, the reliability of the entire vehicle air conditioner 1 can be enhanced while achieving miniaturization of the heating-medium heating unit 10 and a reduction in the manufacturing cost.

Although this embodiment has been described as applied to an example in which the heating-medium heating unit is used in a vehicle air conditioner, the heating-medium heating unit according to the present invention may be applied to air conditioners that are not designed for vehicles, heaters, refrigerators and so on.

REFERENCE SIGNS LIST 1 vehicle air conditioner
4 blower
5 cooler
6 radiator
10 heating-medium heating unit
20 board-accommodating box serving as box component
21 cap serving as box component
22 control board for controlling PTC heater
28 wire insertion hole serving as portion communicating with board-accommodating space
30 upper heating-medium circulation box serving as box component
33 circulation path serving as heating-medium circulation passage
38 radiating surface
40 PTC heater
40b wiring member of PTC heater
41a, 41b, 41c PTC device
50 lower heating-medium circulation box serving as box component
51 cap serving as box component
54 circulation path serving as heating-medium circulation passage
56 radiating surface
A first heating-medium circulation box
B second heating-medium circulation box
C1, C2 joining-surface cooling channel
M1 to M4 joining surface
M3a outside sealing section
M3b board sealing section
S board-accommodating space
W1 width of outside sealing section
W2 width of board sealing section

The invention claimed is:
1. A heating-medium heating unit, comprising:
a flat PTC heater;
a first heating-medium circulation box having at least a first box component and a second box component; and
a second heating-medium circulation box having at least a third box component and a fourth box component are stacked on one another;
a plurality of first heating-medium circulation passages formed in an interior of the first heating-medium circulation box; and
a plurality of second heating-medium circulation passages formed in an interior of the second heating-medium circulation box,
wherein the first heating-medium circulation box is in contact with a first surface of the flat PTC heater,
wherein the second heating-medium circulation box is in contact with a second surface of the flat PTC heater,
wherein the first heating-medium circulation box is stacked on the second heating-medium circulation box,
wherein a heating medium that circulates through the plurality of first heating-medium circulation passages and the plurality of second heating-medium circulation passages in the first heating-medium circulation box and the second heating-medium circulation box is heated by heat from the PTC heater,
the heating-medium heating unit further comprising a liquid gasket for sealing at least one of a stacked portion of the first box component and the second box component, a stacked portion of the third box component and the fourth box component, and a stacked portion of the first heating-medium circulation box and the second heating-medium circulation box,
wherein at least one of the plurality first heating-medium circulation passages or at least one of the plurality second heating-medium circulation passages is for cooling the at least one of the stacked portions,
wherein the flat PTC heater and the first heating-medium circulation box and second heating-medium circulation box are formed in a rectangular shape,
wherein, in a plan view of the first box component of the first heating-medium circulation box, at least one of the stacked portion of the first box component and the second box component and the stacked portion of the third box component and the fourth box component has a first part consisting of a pair of sides opposing to each other in parallel to a direction perpendicular to a longitudinal direction of the first heating-medium circulation box at the stacked portion and a second part consisting of a pair of sides opposing to each other in parallel to a longitudinal direction of the first heating-medium circulation box at the stacked portion, the second part crossing the sides of the first part on a same surface as the stacked portion provided with the first part,
wherein, in a plan view of the first box component of the first heating-medium circulation box, one end in the longitudinal direction of the first part is provided with a hole having a substantially rectangular shape through which a harness passes for connecting a board for controlling the PTC heater, and a distance between the plurality of first heating-medium circulation passages and a side of the hole, the side being nearest to the plurality of first heating-medium circulation passages, is larger than the width of the second part,
wherein the second part seals a space between the plurality of first heating-medium circulation passages and the outside.

2. The heating-medium heating unit according to claim 1, wherein the plurality of first heating-medium circulation passages for cooling the at least one of the stacked portions is provided at a position closer to the stacked portion sealed with the liquid gasket than to the flat PTC heater.

3. The heating-medium heating unit according to claim 1, wherein a contact surface of at least one of the first heating-medium circulation box and the second heating-medium circulation box, the contact surface-being in close contact with the flat PTC heater, and the stacked portion between the first heating-medium circulation box and the second heating-medium circulation box are formed as a continuous flat surface between the contact surface and the stacked portion.

4. The heating-medium heating unit according to claim 1, a wiring member of the flat PTC heater extends from an end of the flat PTC heater in the longitudinal direction.

5. The heating-medium heating unit according to claim 4, wherein PTC devices that constitute the flat PTC heater are disposed in a plurality of rows along the channel direction of the heating-medium circulation passages, the PTC devices have different widths, and ON/OFF states of the PTC devices can be individually controlled.

* * * * *